United States Patent
Bland et al.

[19]

[11] Patent Number: 6,161,294
[45] Date of Patent: Dec. 19, 2000

[54] OVERHEAD SCANNING PROFILER

[75] Inventors: Loren L. Bland, Carpinteria; Walter Naumann, Santa Barbara; Gilbert Short, Santa Barbara; Robert G. Rizos, Santa Barbara; Timothy Cunningham, Santa Barbara, all of Calif.

[73] Assignee: Sloan Technologies, Incorporated, Santa Barbara, Calif.

[21] Appl. No.: 09/046,318

[22] Filed: Mar. 23, 1998

[51] Int. Cl.[7] .............................. G01B 3/14; G01B 1/00
[52] U.S. Cl. .......................... 33/1 M; 33/503; 33/533; 33/549; 73/104; 324/758
[58] Field of Search ............................. 33/1 M, 503, 533, 33/549, 553, 554, 555, 559, 561; 73/104, 105; 324/158.1, 754, 758, 770

[56] References Cited

U.S. PATENT DOCUMENTS

| | | | |
|---|---|---|---|
| 3,241,243 | 3/1966 | Speer | 33/1 M |
| 3,434,218 | 3/1969 | Potter | 33/1 M |
| 3,675,333 | 7/1972 | Wilson | 33/1 M |
| 3,774,311 | 11/1973 | Stemple | 33/1 M |
| 4,142,296 | 3/1979 | Miller | 33/181 R |
| 4,155,173 | 5/1979 | Sprandel | 33/1 M |
| 4,306,464 | 12/1981 | Mosher | 33/1 M |
| 4,391,044 | 7/1983 | Wheeler | 33/174 P |
| 4,450,746 | 5/1984 | Howard et al. | 73/105 |
| 4,689,491 | 8/1987 | Lindow et al. | 250/572 |
| 4,755,746 | 7/1988 | Mallory et al. | 324/158 F |
| 4,778,313 | 10/1988 | Lekmkuhl | 33/561 |
| 4,945,501 | 7/1990 | Bell et al. | 364/571.05 |
| 5,003,254 | 3/1991 | Hunt et al. | 324/158.1 |
| 5,309,755 | 5/1994 | Wheeler | 73/105 |
| 5,339,531 | 8/1994 | Ogiwara | 33/1 M |
| 5,453,616 | 9/1995 | Wakiyama | 73/105 |
| 5,466,935 | 11/1995 | Ray et al. | 73/105 |
| 5,675,082 | 10/1997 | Marr et al. | 73/432.1 |
| 5,731,708 | 3/1998 | Sobhani | 324/758 |

FOREIGN PATENT DOCUMENTS

| | | | |
|---|---|---|---|
| 0 254 429 A1 | 1/1988 | European Pat. Off. | G12B 17/08 |
| 2 272 769 | 5/1994 | United Kingdom | G01B 5/20 |

OTHER PUBLICATIONS

European Search Report, Jul. 21, 1999.
Integration of a Surface Measuring Device into a Coordinate Measuring Machine, *Quality* Europe, vol. 1991, No. 1, H.U. Golz et al., Munich/DE, 1991.
Stylus Profilers in AMLCD Manufacturing, *Solid State Technology*, vol. 1996, no. Jun., J. Donelly et al., 1996.

*Primary Examiner*—Randy W. Gibson
*Attorney, Agent, or Firm*—Morgan & Finnegan, L.L.P.

[57] ABSTRACT

An apparatus and method for surface profile measurements of large samples. The sample is held by a stationary chuck, while a four-axis (X, Y, Z and theta axis) positioning assembly manipulates and positions an overhead scan assembly and measurement stylus to perform the profilometry. To observe the sample surface in the vicinity of the measurement stylus, an illumination and imaging capability is also provided. Backlash and error are reduced in the Z axis assembly through use of cams and cam followers, and in the scan assembly through use of multiple tensioned wires, with low-friction sliding elements. The apparatus reduces vibration and supports heavy (up to 400 kg) samples while allowing accurate profile measurements.

39 Claims, 8 Drawing Sheets

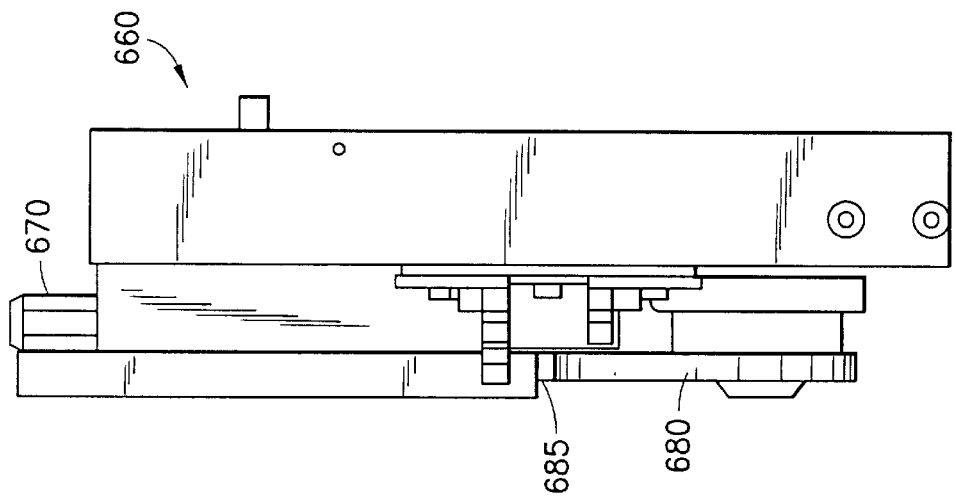
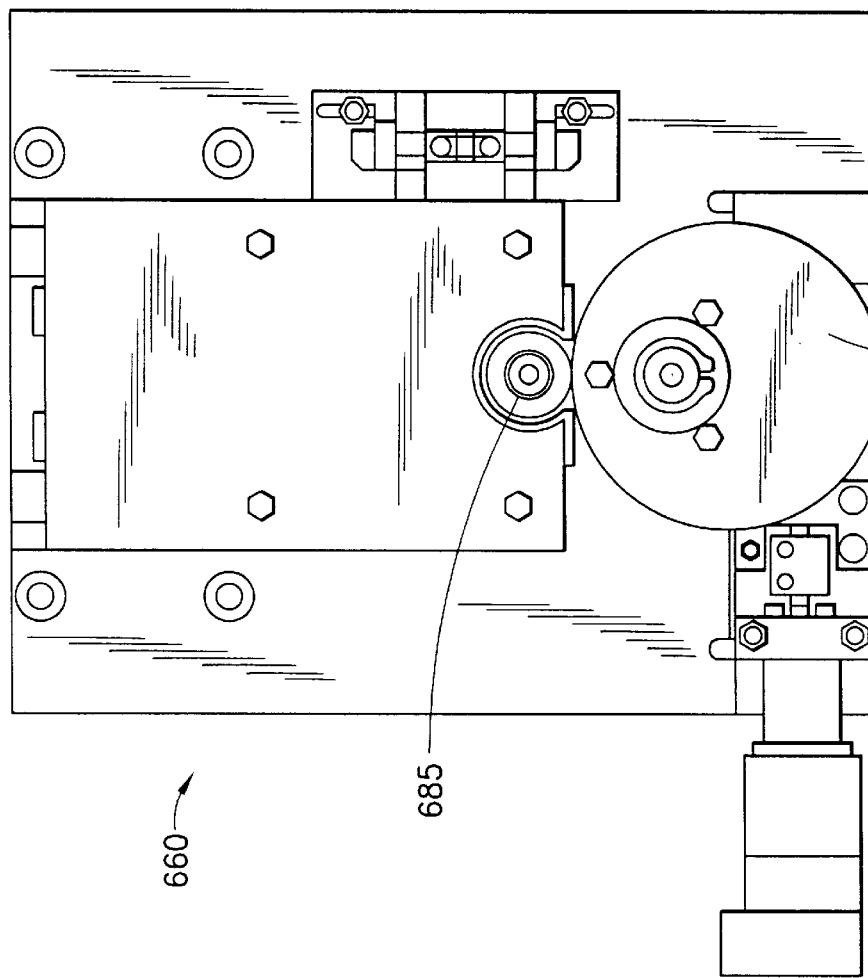

OVERHEAD SCANNING PROFILER

FIELD OF THE INVENTION

This invention relates to surface profilometry, and more particularly to overhead scanning profilometry of large samples.

BACKGROUND OF THE INVENTION

The ability to measure surface characteristics of flat panel displays has become more challenging as the size of the displays increases with evolving technology. The most common type of flat panel display is essentially a multi-layer sandwich of 0.7 mm thick glass sheets, plus mechanical support structure and electronics to address the pixels in the display. Until recently, the largest flat panels being fabricated were approximately 650 mm long. Today, however, there are a number of plants preparing to produce larger panels having dimensions up to 1100 mm long by 800 mm wide.

During production of flat panel displays, an accurate surface profile is required. Profiling entails measuring and mapping surface steps and irregularities across the panel. If the surface steps are the wrong height, or irregularities are sufficiently large, the panel must be rejected.

Emerging State-of-the-art large panels present difficulties for the prior art surface profilers which were originally designed to profile silicon wafers sized less than 200 mm in diameter. In most of the prior art designs, the measurement head was held stationary while the sample was moved beneath the stylus. Another prior art profiler design is described in U.S. Pat. No. 4,391,044 to Wheeler, entitled "Metrology Instrument for Measuring Vertical Profiles of Integrated Circuits and the Like," which is incorporated by reference herein. This profiler was designed for small samples, such as silicon wafers and other electronic components, but cannot measure large samples, such as 1 m flat panel displays.

SUMMARY OF THE INVENTION

It is therefore an object of the present invention to provide an overhead scanning profiler, comprising an overhead scanning assembly which is supported on a base and has a positioning assembly to position the overhead scanning assembly in relation to a sample that is fixed relative to the base. In this manner, the overhead scanning profiler is able to measure the sample height and thereby provide a profile of the surface of the sample.

It is a further object of the present invention to provide the profiler with the ability to position the scan start in two dimensions laterally and to position the scan assembly vertically into the measurement range. The lateral and vertical axis being orthogonal.

It is a further object to provide the profiler with the ability to position rotate the scan assembly in a rotational direction, to allow scan in different directions.

It is a further object to provide a flat chuck having a total indicator run-out of 0.002 inches, flat chuck mounted on the stationary base and holding the sample.

It is a further object to provide a chuck for the profiler that supports sample masses of up to 400 kg.

It is a further object to provide a vibration isolation base, which may be pneumatic, for the profiler.

It is a further object to provide a chuck for the profiler that is constructed of a dimensionally stable material like cast aluminum; sheet metal bonded to granite; or cast iron.

It is a further object to provide a chuck for the profiler with means for vacuum attachment of the sample.

It is a further object to provide an illumination and imaging capability to view the area around the profile measurement stylus.

It is a further object to provide a linear scan assembly that has minimal backlash and does not torque on translation of the measurement stylus. The scan assembly uses at least two wire tensioning hubs and at least one wire, each wire being wrapped around two of the wire tensioning hubs. At least one tensioning hub is rotated by a motor, thereby moving the wires. The wires are attached to a sliding follower with opposing sides attached to the wires. The slider rides on flat reference surfaces when the motor moves the wires. The flat reference surfaces are preferably made of glass, though other materials might include: ceramic, INVAR, anodized aluminum, or cast iron. The flat reference surfaces are flat to a tolerance of better than 50 nanometers. Between the slider and the reference surface, two low-friction pads reduce friction, while maintaining alignment. The pads are constructed entirely of TEFLON (a polytetrafluoroethylene coating) or are faced with TEFLON or other material for reducing friction. The pads are fixed to the top and one side of the slider and are attached with a flexure on the other side of the slider to accommodate non-uniformities in the reference surface. The wire applies a force to the sliding follower. A measurement stylus assembly is attached to the sliding follower, including a sensor assembly attached to the measurement stylus for measuring the stylus vertical displacement.

A rotation drive is mounted above the scan assembly, whereby a centerline of rotation includes the measurement stylus. The rotation, or theta, drive of the scanning profiler rotates the scanning assembly.

The measurement stylus is moved in a vertical direction by a Z-axis drive, which comprises a crossed roller bearing slide, wheel and cam, cam follower, motor and worm.

Limit switches are provided for limiting the motion of the measurement stylus assembly. Finally, a base supporting the scanning profiler, includes at least three vibration isolators, and at least three leveling feet, the base supports a flat chuck adapted for holding a sample.

The flat chuck is flat to a tolerance of about 0.0001 to 0.002 inch TIR (total indicator run-out). The chuck supports samples weighing up to approximately 400 kg. In the preferred embodiment, the footprint of the profiler exceeds the area of the chuck by no more than a factor of 2.5. The chuck is preferably made of cast aluminum, though it may also be constructed of granite bonded with sheet metal, cast iron, or aluminum bonded with stainless steel. In one embodiment of the invention, the chuck contains surface openings through which a vacuum is applied to the sample. The chuck may also have lifters to allow access with robot arms.

It is not intended that the invention be summarized here in its entirety. Rather, further features, aspects and advantages of the invention are set forth in or are apparent from the following description and drawings.

BRIEF DESCRIPTION OF THE DRAWINGS

FIG. 8B is a view of the Z-axis drive in the down position.

FIG. 8C is another view of the Z-axis drive in the up position.

DETAILED DESCRIPTION OF THE INVENTION

Figure 1:
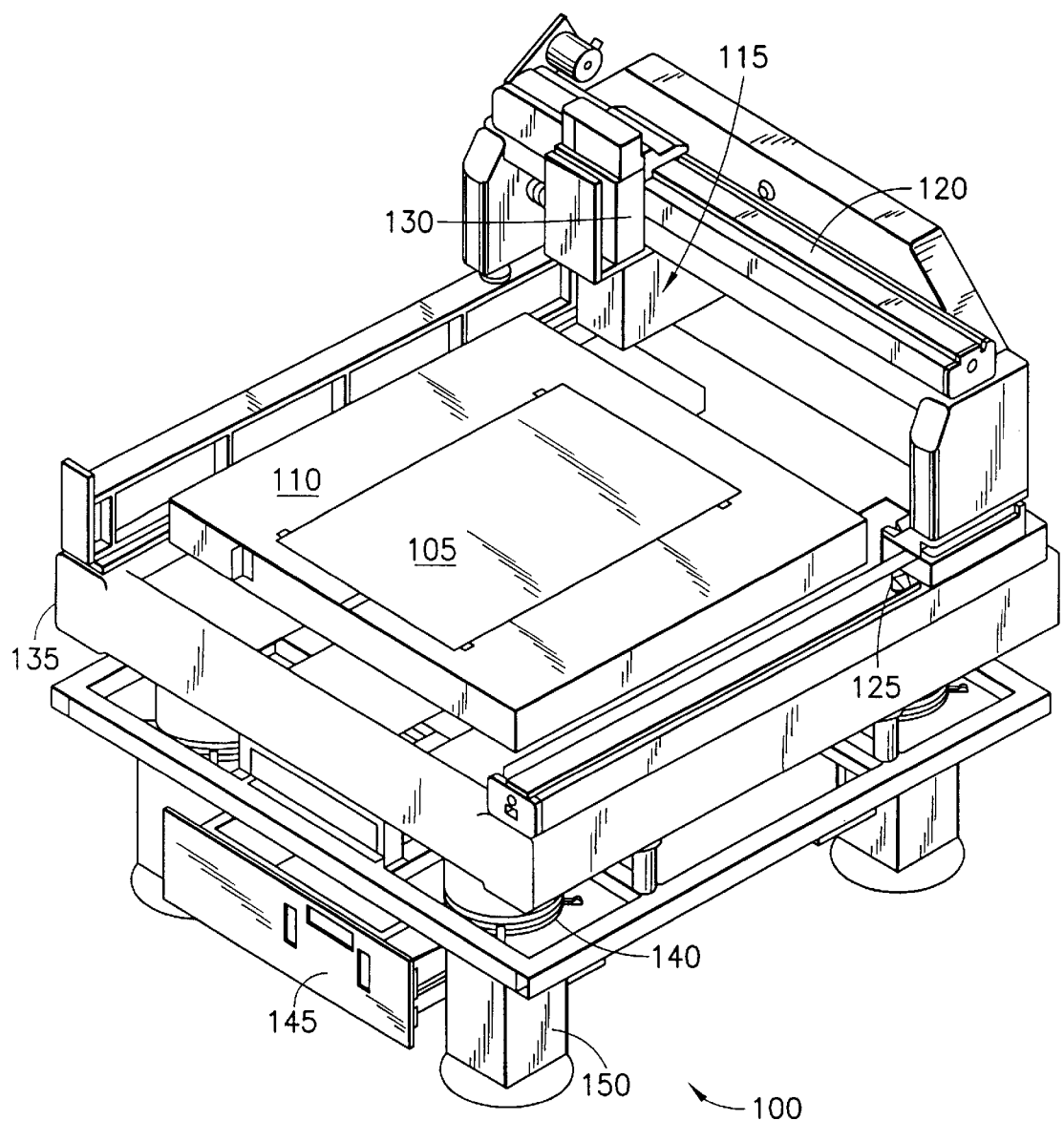
FIG. 1 is a perspective/overhead view of the overhead scanning profiler.

Referring to FIG. 1, there is shown a perspective/overhead view of the overhead scanning profiler 100 with the outer skins and frame removed. Panel 105 is the flat panel display or other component which is the specimen to be tested and rests upon the chuck 110. Chuck 110 is a flat plate which, in one embodiment, holds panel 105 with vacuum applied to small holes in its surface, and in another embodiment holds the panel with gravity only. Chuck 110 is preferably flat to a tolerance in the range of about 0.0001 to 0.002 inches total indicator run-out. Chuck 110 is preferably constructed of five inch thick isogrid aluminum to reduce vibrations.

In the preferred embodiment, chuck 110 is made of cast aluminum. In alternative embodiments, the chuck 110 may be made of aluminum or stainless steel sheet bonded to cast aluminum, sheet metal bonded to granite, or cast iron. Panel 105 is scanned by overhead scanning assembly 115. The overhead scanning assembly is positioned by X-axis drive 120, Y-axis drive 125, and Z-axis drive 130. The overhead scanning assembly is also positioned in a rotational direction by a theta drive. Once positioned by these drives, the overhead scanning assembly is able to linearly scan the sample. Details of the mechanism for the overhead scanning assembly are not visible in FIG. 1. The scanning assembly and drive mechanisms are shown in further detail in FIGS. 3 through 6.

The chuck 110, overhead scanning assembly 115, X-axis drive 120, Y-axis drive 125, and Z-axis drive 130 are supported by a base 135 which rests on isolation legs 140 for vibration control. The isolation legs 140 are supported by a frame and fixed legs with leveling feet 150. Also shown in FIG. 1 is an electronics rack 145 mounted between the fixed legs 150.

Figure 2:
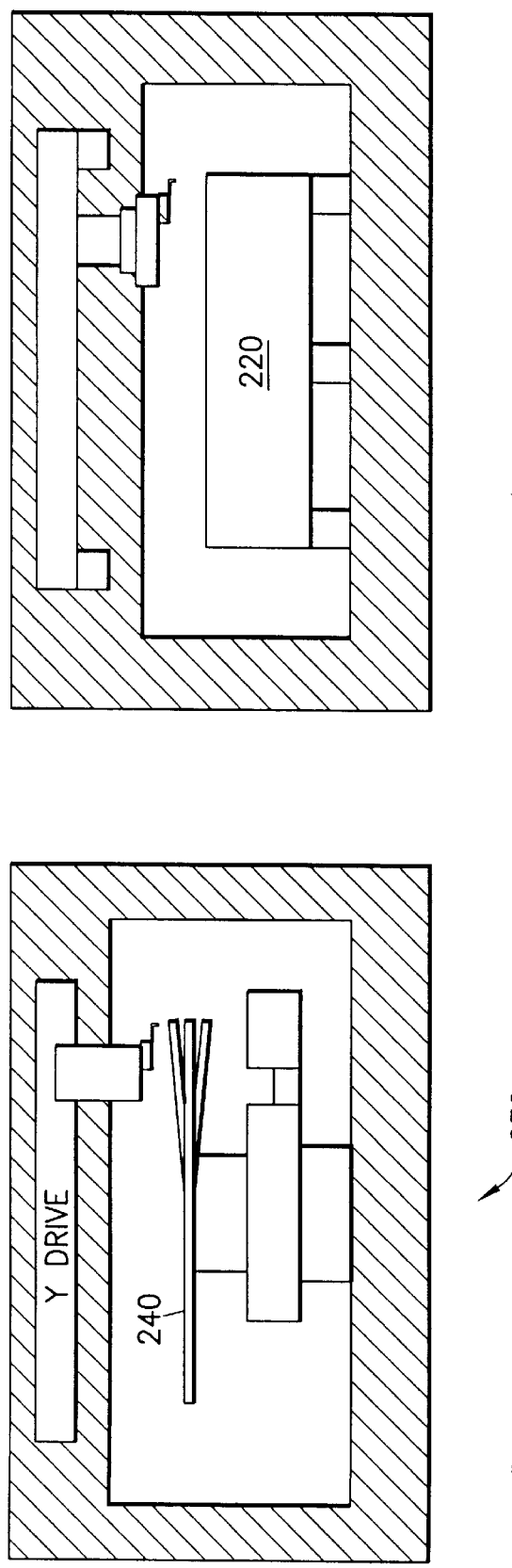
FIG. 2 is a stability comparison of a prior art profiler and the overhead scanning profiler according to the present invention.

FIG. 2 shows a stability comparison between a typical prior art profiler 230 and the present invention overhead scanning profiler 210. Because the chuck 220 in the present invention is not scanned, it is constructed to be heavy and solid for better performance than the light-weight chuck 240 which must be used when the entire stage is scanned using prior art profiler 230. Prior art profiler 230 leads to vibration and produces error in sample measurement which is minimized by the present invention overhead scanning profiler 210. In a preferred embodiment, the chuck 220 in the present invention is over 300 pounds in weight. The chuck assembly in prior art profilers is generally limited to less than 100 pounds. The additional mass contributes to greater stability in the present invention.

Figure 3:
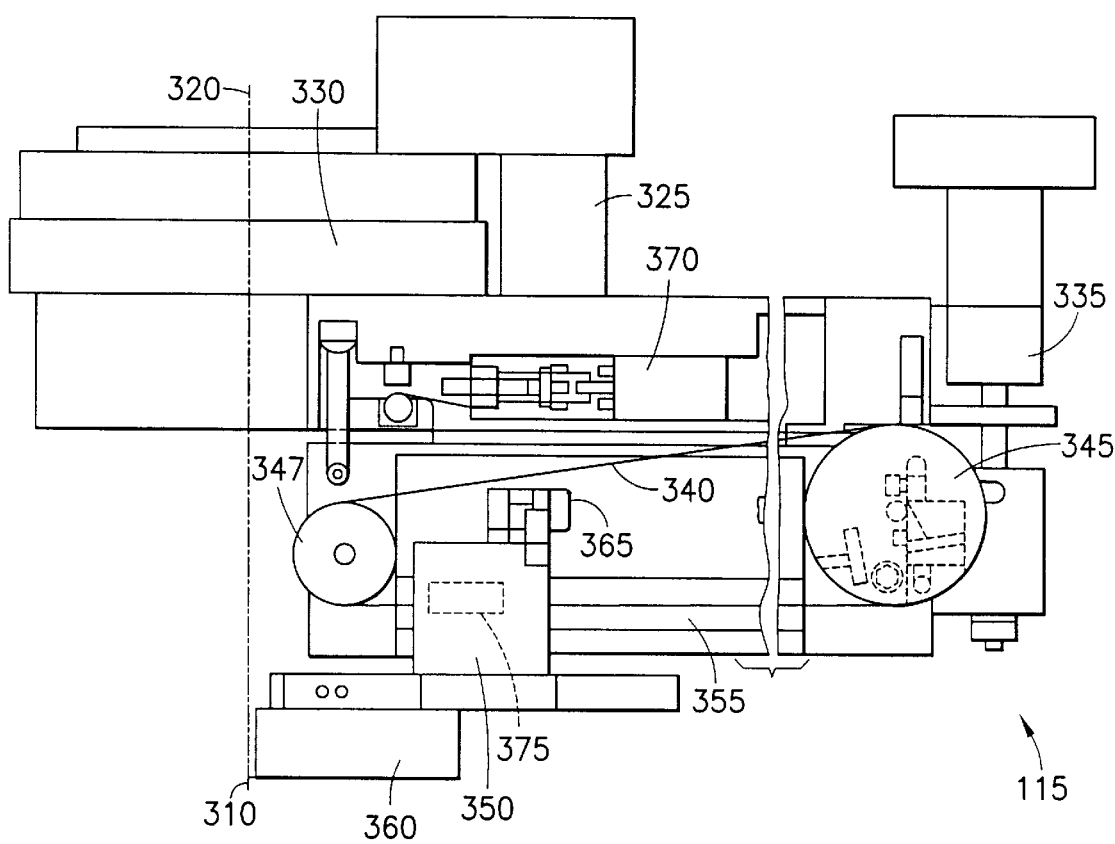
FIG. 3 is a side view of the overhead scanning assembly.

FIG. 3 is a side view of the overhead scanning assembly 115. Measurement stylus 310 lies on centerline of rotation 320 about which the overhead scanning assembly 115 rotates via the rotation drive 330, also known as the theta drive. The measurement stylus 310 is scanned by the motor 335, wires 340, wire tensioning hubs 345, front pulley 347, wire-driven sliding follower 350, flexures 375, and reference surface 355. As illustrated in FIG. 3, this preferred embodiment of the scan assembly scans from left to right. In FIG. 3, wire tensioning hubs 345 are driven by motor 335; wire tensioning hubs 345 drive the wires 340 which produce the scan of the measurement stylus 310. Front pulley 347 controls the position of the wires 340. It is desirable to use two wires because the resultant center of force is centered between the two wires 340, and thus in the center of the reference surface 355, which is the center of friction resistance. In this configuration, friction between the sliding follower 350 and the reference surface 355 does not produce torque, so the sliding follower 350 does not tilt and measurement error is therefore minimized.

A low-inertia sensor assembly 360 is attached to the measurement stylus 310 for measuring the vertical displacement of the stylus 310. Limit switches 365 restrict the movement of the measurement stylus 310 according to the mechanical limitations of the overhead scanning assembly 115. In an alternative embodiment, an optional leveling assembly 370 enables profiling of a specimen with a surface which is not level. The leveling assembly 370 allows the scan level to be adjusted to the average slope of the specimen preventing the measurement from exceeding the sensor full scale limit.

Figure 4:
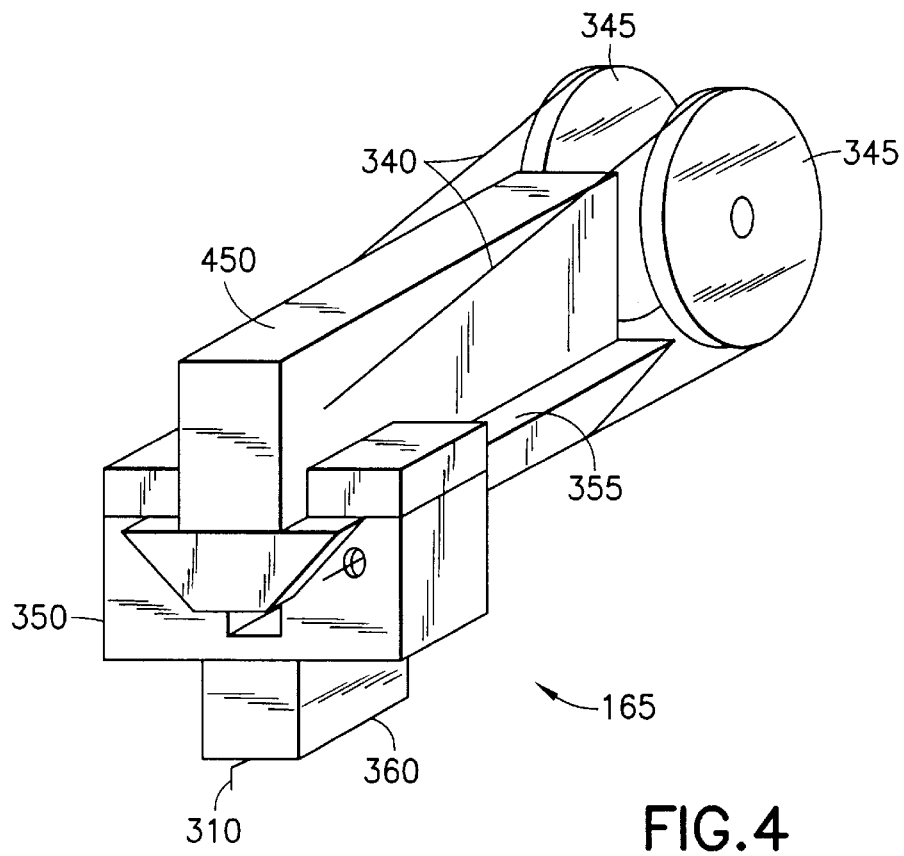
FIG. 4 is a perspective view of the measurement stylus assembly.

FIG. 4 is a perspective view of a preferred embodiment of the overhead scanning assembly 115, with some elements omitted for clarity. The measurement stylus 310 is attached to the sensor assembly 360 which is mounted beneath the sliding follower 350. The sliding follower 350 includes the flexures (375 in FIG. 3) which slide along the reference surface 355. The flexures are the holders for the material which rests on the reference surface 355 for providing smooth travel; this material is preferably a low-friction material similar to TEFLON. Rectangular stiffener 450 is rigidly attached to reference surface 355 and provides mechanical stabilization for the reference surface. In this preferred embodiment, wire pairs 340 are pulled by a pair of wire tensioning hubs 345 and thereby deliver the scan drive power from the motor (335 in FIG. 3) to the sliding follower 350. Reference surface 355 provides the flatness tolerance for the scan and is flat to better than about 50 nanometers. Preferably, reference surface 355 is made of glass. Alternatively, reference surface 355 may be made of any dimensionally stable hard material. Examples would include ceramic, INVAR, anodized aluminum, or cast iron.

Figure 5:
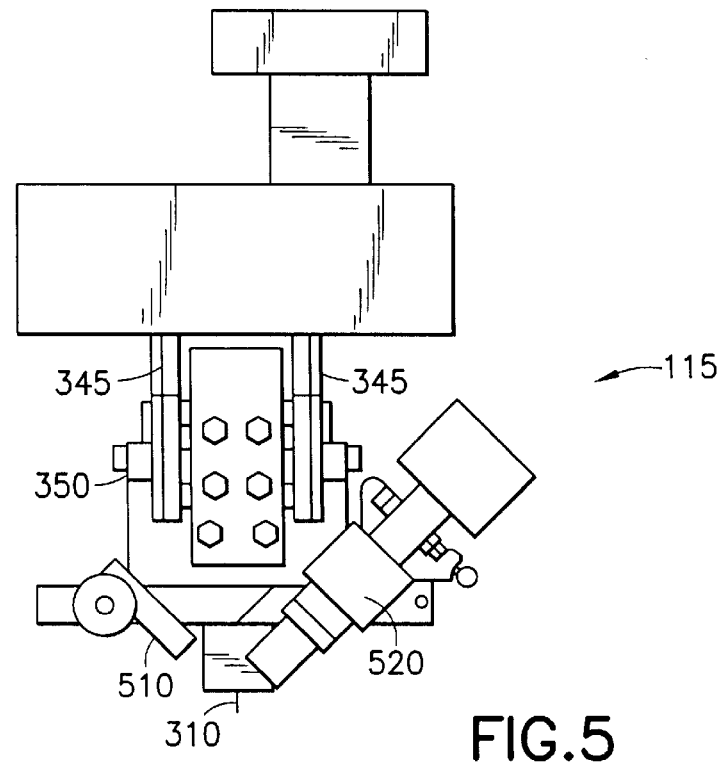
FIG. 5 is a front view of a portion of the overhead scanning assembly.

FIG. 5 is a front view of a preferred embodiment of the overhead scanning assembly 115. Illuminator 510 illuminates the sample under test (not shown) which is viewed by a high magnification imaging device or camera 520. In a preferred embodiment, the imaging device is a video microscope. Preferably, camera 520 provides a scanned 45 degree (250×) view. This enables the operator to focus on a specific portion of the sample under test. Also shown in FIG. 5 are the wire tensioning hubs 345, sliding follower 350, and measurement stylus 310.

Figure 6:
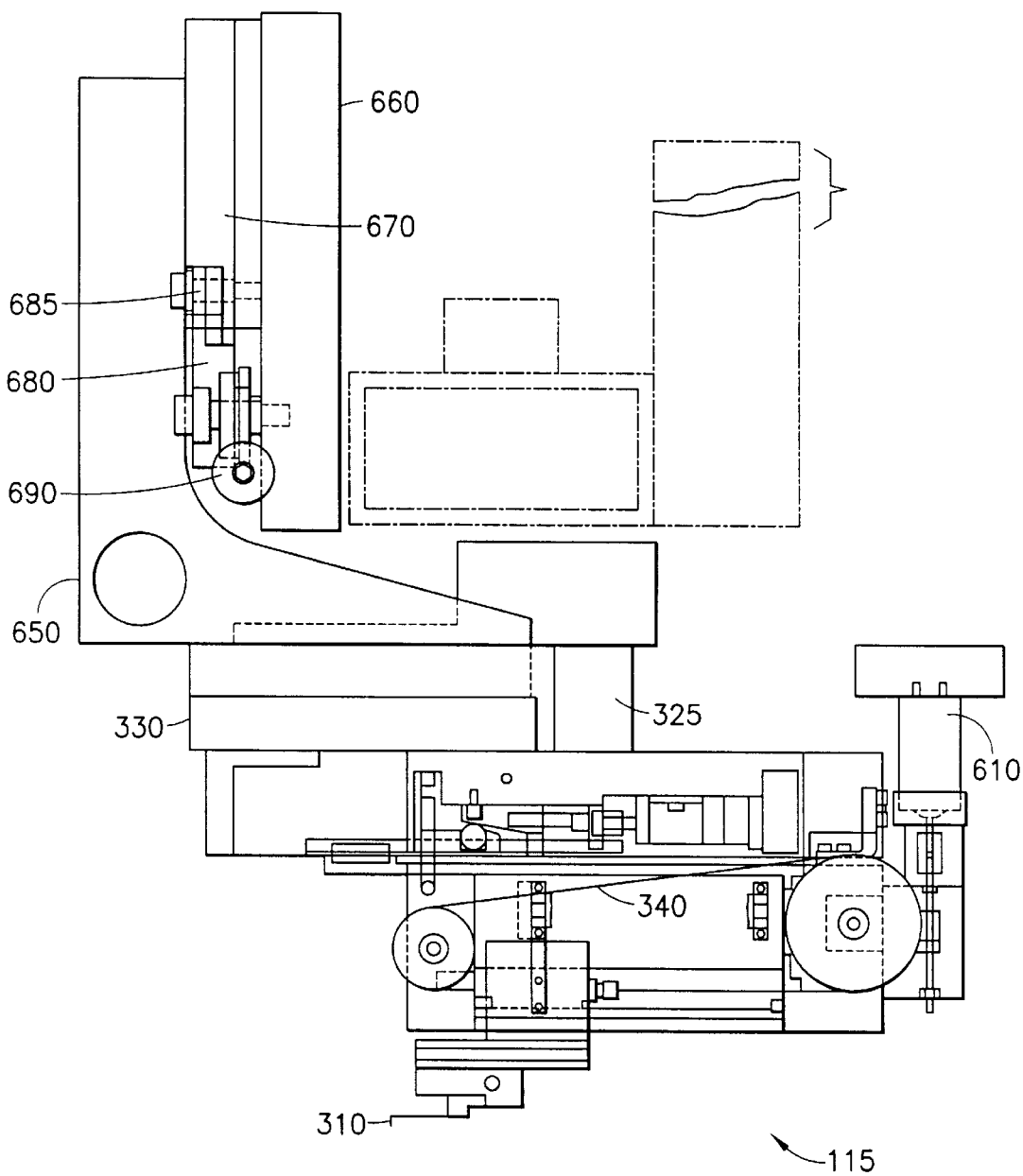
FIG. 6 is a side view of the overhead scanning assembly.

FIG. 6 is a side view of the overhead scanning assembly 115 and supporting structure. Scan motor 610 pulls the wires 340 of the overhead scan assembly 115. The theta (rotation) drive 330, which allows the overhead scanning profiler 115 to scan in any angular direction across the panel under test, is shown above the overhead scan assembly 115. An L-bracket 650 is mounted above theta drive 330 and is supported by the Z-drive 660, which positions the measurement stylus assembly at the correct height over the panel under test. A theta motor 325 and encoder (not illustrated) operate together to position the measurement stylus 310 and are part of the theta drive assembly 330. The Z-axis drive is illustrated generally at 660.

Referring to FIGS. 6 and 8A–8C, the Z-axis drive is illustrated in greater detail. The Z-axis drive 660 includes a crossed roller slide 670, wheel and cam 680, cam follower 685, which is a rotating bearing that rides on wheel and cam 680, and worm 690, which drives the wheel and cam 680. The Z-drive 660, L-bracket 650, theta drive 330, and scan assembly 630 are collectively called the tower assembly.

Figure 8A:
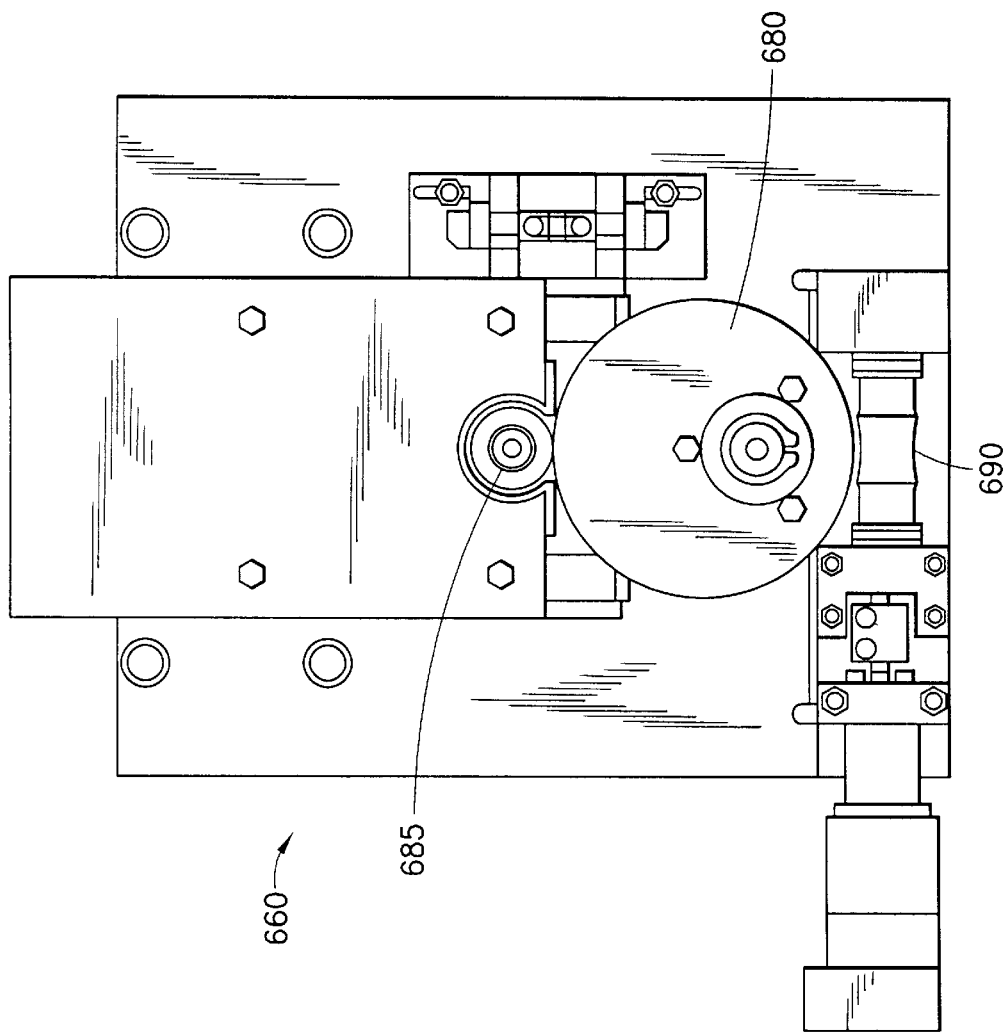
FIG. 8A is a view of the Z-axis drive in the up position.

In FIG. 8A, the Z-axis drive is illustrated in the raised position, while in FIG. 8B, the Z-axis drive is illustrated in the down position. As illustrated, rotation of wheel and cam 680 by the worm 690 results in linear motion along the crossed roller slide 670.

Figure 7:
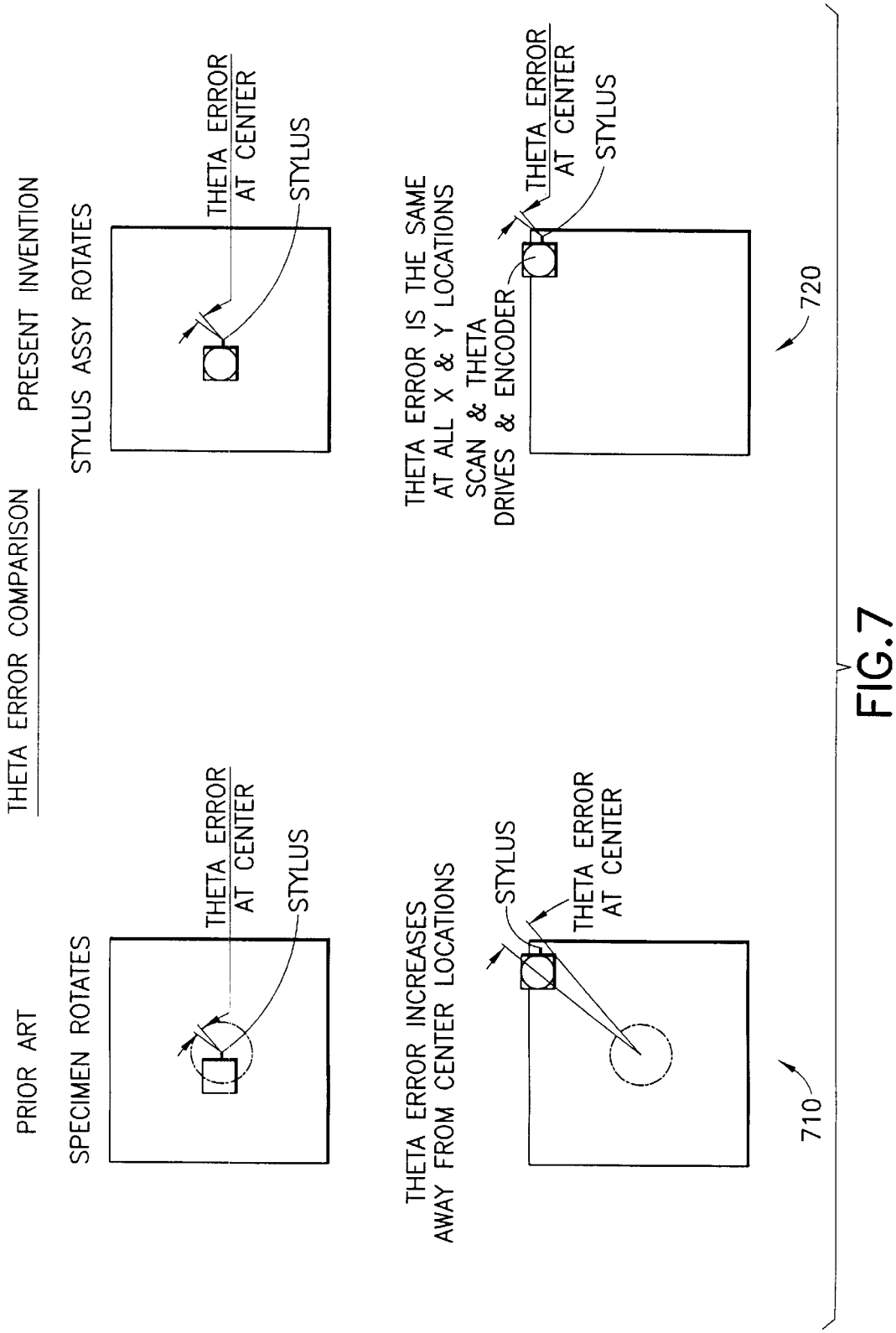
FIG. 7 is a theta (rotation) error comparison of a prior art profiler and the overhead scanning profiler of the present invention.

FIG. 7 is a rotation error comparison of a prior art profiler and the overhead scanning profiler of the present invention. Prior art profiler 710 rotates the specimen to change the direction of the scan relative to the specimen. As illustrated, the center of rotation is located at the center of the specimen. Consequently, in the prior art, while the angular measurement error is constant, the linear error will increase with distance away from the specimen center. This problem is eliminated using the profiler 720 according to the present invention. Profiler 720 has a rotating stylus assembly which results in minimal angular measurement error, independent of X-Y position with respect to the specimen center. This is achieved because the center of rotation of the scan translates in the X-Y plane and is centered on the stylus, not on the center of the specimen as in prior art profiler 710.

Various advantages of the present invention will now be discussed. As detailed in the discussion of FIG. 2, prior art profilers employ movable chucks in which scan performance at the edge of the chuck declines as the panel size is increased. The chuck weight is limited to less than 100 pounds by the need to move it precisely during scanning. Maintaining light weight while being able to accommodate larger panel sizes results in a flimsy chuck that vibrates excessively in response to environmental vibration noise. This leads to poor quality measurements at the edges of the chuck. In the present invention, the chuck is stationary at all times and can thus be very heavy and stiff, weighing over 300 pounds. Further, the chuck is mounted on pneumatic isolation legs which increase the vibration insensitivity of the overhead scanning profiler. This improvement over prior art profilers is significant in the accurate surface profilometry of large flat panel displays.

Another advantage of the present invention is its minimal footprint. Footprint refers to the amount of floor space occupied the profiler. In prior art profilers, the footprint had to cover an area at least as large as 2× the sample size, plus area for an outer frame and skins. The foot print exceeds the area of the chuck by more than a factor of three. This was necessary in order to move any point on the sample to a point underneath the measurement stylus. In the present invention, the sample and chuck stay stationary while the much smaller measurement head is translated from point to point over the sample. Thus, the total footprint of the profiler need only be equal to the sample size, plus area for an outer frame and skins. In the present embodiment, the total footprint is less than a factor of 2.5 larger than the area of the chuck. The chuck in the present embodiment is 1100 mm wide. It is within the scope of the present invention to have a larger chuck of 1800 mm and greater.

Yet another advantage of the present invention is the ability to measure very heavy samples. The mass of flat panel display assemblies, such as plasma tube displays, may exceed 30 kg. Prior art profilers could only accommodate a limited sample mass. Performance would degrade with sample masses of over 10 kg. The apparatus that moved the stage during a scan could not accommodate greater mass; neither could the thin chuck. The chuck in the present invention can accommodate sample masses in excess of 400 kg.

Still another advantage of the present invention is the accuracy of the scanning apparatus. Referring to FIG. 3, the wire-driven sliding follower 350 is pulled by two wires 340, one on each side of the sliding follower. The wires are driven by a single motor 335 so their motion is synchronized and the force on the sliding follower 350 is directly along the axis of the reference surface 355. This is critical to preventing the sliding follower 350 from "wandering" on the reference surface 355, leading to inaccurate measurements. It is more difficult to orient one wire to produce a pulling force centered on the reference surface and flexures 375 around it. If un-centered, one pull wire would therefore produce a torque on the stage, its magnitude depending on friction, resulting in scan errors. Such errors are avoided by the two-wire design of the present invention.

Yet another advantage of the present invention is the geometry of the assembly, which places the stylus at the center of scan head rotation at the start of every scan, as discussed with regard to FIG. 7. The scanning method employed by the present invention greatly decreases the error in stylus placement due to imprecision in the theta (rotation) drive. In the prior art profiler 710, placement error due to a given rotation error is small near the center of the chuck, but gets progressively worse as the edges of the chuck are approached. This is because the center of rotation is at the center of the chuck. In the present invention 720, the center of rotation is directly above the stylus tip (+/− machining and assembly tolerances), so the placement error for a given rotation error is small and uniform at any point on the chuck. This allows chuck and sample size to be expanded with no detrimental effect on placement error.

Another advantage of the present invention is the overhead scanning profiler Z-drive design shown in FIG. 6. The Z-drive 660 is a very stiff and cost-effective design compared to Z-drives incorporating lead screws on prior art stylus profilometers. The stiffness of the Z-drive of the present invention is over $10^6$ pounds per inch, while previous drives had stiffness below $10^6$ pounds per inch.

Z-drive 660 uses a worm 690 and cam 680 pair with a cam follower 685 attached to a crossed roller bearing slide 670. The bearing slide 670 and cam follower 685 have no backlash with respect to the cam 680, allowing very precise vertical positioning.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A scanning profiler, comprising:
 an overhead scanning assembly including a linearly scanned distance measurement stylus to measure a surface profile of a sample;

a positioning assembly to position the overhead scanning assembly in three orthogonal directions relative to the sample; and a base supporting the positioning assembly and the overhead scanning assembly, wherein the base supports the positioning assembly on opposite sides of the sample and the sample is fixed relative to the base.

2. The scanning profiler of claim 1, further comprising:
a rotational assembly, wherein the rotational assembly further positions the overhead scanning assembly in a rotational direction relative to the sample.

3. The scanning profiler of claim 1, wherein the overhead scanning assembly includes
a contact measurement stylus to measure the surface profile of the sample.

4. The scanning profiler of claim 1, wherein the positioning assembly further comprises:
an X-axis drive;
a Y-axis drive orthogonal to the X-axis drive; and
a Z-axis drive orthogonal to both the X-axis and Y-axis drive.

5. The scanning profiler of claim 1, wherein the positioning assembly comprises a Z-axis drive, which further comprises:
at least one slide, providing sliding linear motion of the overhead scanning assembly relative to the base;
at least one cam;
at least one cam follower, which is a rotating bearing and which rides on the cam;
at least one motor; and
at least one worm which is driven by the motor and which drives the cam.

6. The scanning profiler of claim 5, wherein the slide is at least one crossed roller slide.

7. The scanning profiler of claim 1, further comprising:
at least one pneumatic isolation leg on the base.

8. The scanning profiler of claim 1, further comprising:
a flat chuck attached to the base and adapted for holding the sample.

9. The scanning profiler of claim 8, wherein the flat chuck is made of aluminum.

10. The scanning profiler of claim 8, wherein the flat chuck is flat to a tolerance of at least 0.002 inches TIR.

11. The scanning profiler of claim 8, wherein the flat chuck has at least a three point support.

12. The scanning profiler of claim 8, wherein the flat chuck supports up to a 400 kg sample.

13. The scanning profiler of claim 8, wherein the adaptation for holding the sample further comprises:
a vacuum source operating through a plurality of openings in the chuck to removably hold the sample to the chuck.

14. An overhead scanning assembly supported by a base assembly comprising:
a distance measurement stylus to measure a surface profile of a sample, the stylus positioned in an orthogonal X, Y and Z position relative to the sample fixed to the base.

15. The overhead scanning assembly of claim 14, further comprising:
a theta drive to further position the stylus in a rotational direction relative to the sample.

16. The overhead scanning assembly of claim 14, further comprising:
a sensor assembly attached to the stylus for measuring contact displacement of the stylus relative to the sample.

17. The overhead scanning assembly of claim 14, further comprising:
at least one limit switch, the at least one limit switch operating to restrict the movement of the stylus.

18. The overhead scanning assembly of claim 14, further comprising:
an imaging device oriented to provide a view of the area surrounding the stylus.

19. The overhead scanning assembly of claim 14, further comprising:
an illuminator oriented to illuminate the area surrounding the stylus.

20. The overhead scanning assembly of claim 14, further comprising:
a leveling assembly, operating to adjust the slope of a scanned sample.

21. The overhead scanning assembly of claim 14, further comprising:
at least one motor;
at least one wire;
at least one wire tensioning hub attached to the wire, the tensioning hub driven by the motor and having means for tensioning the wire;
at least one front pulley, rotatably engaging the wire; and
at least one wire-driven slider follower fixably attached to the wire, the slider acting to linearly scan the stylus.

22. The overhead scanning assembly of claim 21, further comprising:
at least one reference surface along which the slider slides; and
at least one flexure, which applies pressure between the slider and the reference surface.

23. The overhead scanning assembly of claim 22, wherein the at least one reference surface further comprises glass.

24. The overhead scanning assembly of claim 22, wherein the at least one reference surface further comprises a surface that is flat to a tolerance of 50 nanometers.

25. The overhead scanning assembly of claim 22, wherein the at least one flexure further comprises a flexure containing a low friction material.

26. An overhead scanning assembly supported by a base assembly comprising:
a motor;
two wires;
two tensioning hubs attached to the wires, the tensioning hubs driven by the motor and having means for tensioning the wires;
two front pulleys, rotatably engaging the wires;
a single slide; and
a wire-driven slider follower fixably attached to the wires and slidably contacting the single slide.

27. The overhead scanning assembly of claim 26, further comprising:
three reference surfaces; and
two flexures which apply pressure between the slider and one of the reference surfaces.

28. The overhead scanning assembly of claim 27, wherein the reference surfaces further comprise glass.

29. The overhead scanning assembly of claim 27, wherein the reference surfaces further comprise a surface that is flat to a tolerance of 50 nanometers.

30. The overhead scanning assembly of claim 27, wherein the flexures further comprise flexures containing a low friction material.

31. A vertical drive of an overhead scanning assembly comprising:
   a slider connected to a distance measurement stylus to provide sliding linear motion of the stylus in the vertical direction relative to the overhead scanning assembly;
   a cam attached to the overhead scanning assembly;
   a cam follower, connected to the slider and the measurement stylus, which rotates and rides on the cam;
   a motor; and
   a worm driven by the motor and driving the cam to move the slider and the stylus in the vertical direction.

32. The overhead scanning assembly of claim 31, wherein the slider further comprises a crossed roller slide.

33. A linear scan assembly comprising:
   at least one reference surface on a single slide;
   a sliding follower with a center plane of symmetry and slidably engaging the reference surface of the single slide;
   at least one wire fixably and symmetrically attached to the sliding follower about the center plane;
   a drive motor;
   at least one tensioning pulley driven by the drive motor, the tensioning pulley having means for tension attachment of the wire; and
   at least one front pulley, rotatably engaging the wire, and wherein the symmetric attachment of the wire to the sliding follower reduces or eliminates torque or tilt of the sliding follower.

34. A linear scan assembly comprising:
   three reference surfaces on a single slide;
   a sliding follower with a center plane of symmetry and slidably engaging the reference surfaces of the single slide;
   two wires fixably and symmetrically attached to the sliding follower about the center plane;
   a drive motor;
   two tensioning pulleys driven by the drive motor, the tensioning pulleys having means for tension attachment of the wires; and
   two front pulleys, rotatably engaging the wires.

35. A method for scanning a sample comprising:
   providing an overhead scanning assembly with a linearly scanned distance measurement stylus to measure a surface profile of the sample;
   providing a positioning assembly to position the overhead scanning assembly in three orthogonal directions relative to the sample;
   providing a base supporting the positioning assembly and the overhead scanning assembly, the base supporting the positioning assembly on opposite sides of the sample;
   mounting the sample on the base; and
   scanning the sample with the stylus, wherein the sample and base are stationary.

36. The method of claim 35, further comprising:
   positioning the overhead scanning assembly in one rotational direction relative to the sample.

37. The method of claim 35, further comprising:
   measuring vertical displacement of areas on the sample relative to the base using a contact measurement stylus.

38. The method of claim 35, further comprising:
   vacuum mounting the sample in a chuck that is attached to the base.

39. The method of claim 35, further comprising:
   viewing the sample with an imaging device attached to the overhead scanning assembly.

* * * * *